(12) United States Patent
Knoell et al.

(10) Patent No.: US 12,292,063 B2
(45) Date of Patent: May 6, 2025

(54) LINEAR ACTUATOR

(71) Applicant: Robert Bosch GmbH, Stuttgart (DE)

(72) Inventors: Reiner Knoell, Burgsinn (DE); Marco Knoell, Burgsinn (DE); Michael Goldbach, Lohr A. Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/462,174

(22) Filed: Sep. 6, 2023

(65) Prior Publication Data
US 2024/0117827 A1   Apr. 11, 2024

(30) Foreign Application Priority Data
Oct. 6, 2022   (DE) ..................... 10 2022 210 559.1

(51) Int. Cl.
| F15B 21/02 | (2006.01) |
| F15B 21/14 | (2006.01) |
| F16H 25/22 | (2006.01) |
| F16H 25/20 | (2006.01) |

(52) U.S. Cl.
CPC .............. *F15B 21/02* (2013.01); *F15B 21/14* (2013.01); *F16H 25/2252* (2013.01); *F16H 2025/2075* (2013.01)

(58) Field of Classification Search
CPC ............................................. F16H 2025/2075
See application file for complete search history.

(56) References Cited

U.S. PATENT DOCUMENTS

| 8,573,080 | B2* | 11/2013 | Quenerch'du ...... F16H 25/2454 74/89.25 |
| 8,794,088 | B2* | 8/2014 | Quenerch'Du ......... B64C 13/28 74/89.39 |
| 8,827,205 | B2* | 9/2014 | Mason ..................... B64C 25/30 244/102 R |
| 9,548,637 | B2* | 1/2017 | Rapp ....................... H02K 7/102 |
| 9,969,233 | B2* | 5/2018 | Leglize ................... B64C 25/22 |
| 11,098,789 | B2* | 8/2021 | Wu ....................... F16H 25/2025 |

FOREIGN PATENT DOCUMENTS

| CN | 107089629 B | 8/2018 |
| CN | 108755794 B | 11/2020 |
| DE | 10 2008 007 793 A1 | 8/2009 |
| DE | 10 2010 012 635 A1 | 9/2011 |

(Continued)

*Primary Examiner* — Thomas E Lazo
(74) *Attorney, Agent, or Firm* — Maginot, Moore & Beck LLP (57) ABSTRACT

A linear actuator having a threaded drive including a nut connected to a cantilever tube and a leadscrew coupled to a motor, so that, by rotation of the leadscrew, the threaded nut and the cantilever tube are linearly movable, and, regardless of the position of the cantilever tube, one end the leadscrew projects into the cantilever tube and is connected to a piston which divides an internal space formed by the cantilever tube into a first region on the side of the piston opposite the threaded nut and a second region on the side of the piston facing the nut. The two regions are separated from one another in a fluidically sealed manner. A relief of the threaded drive is improved since the first region is connected to a pressure accumulator to generate a relief pressure in the first region using the first pressure source.

10 Claims, 6 Drawing Sheets

(56) References Cited

FOREIGN PATENT DOCUMENTS

| | | |
|---|---|---|
| DE | 10 2014 224 257 A1 | 6/2016 |
| DE | 10 2020 212 703 A1 | 4/2022 |
| DE | 20 2022 101 057 U1 | 4/2022 |
| DE | 10 2008 010 249 B4 | 8/2022 |
| DE | 102021104601 A1 * | 9/2022 |
| FR | 2739428 A1 * | 4/1997 ................ F15B 1/02 |

* cited by examiner

LINEAR ACTUATOR

This application claims priority under 35 U.S.C. § 119 to application no. DE 10 2022 210 559.1, filed on 6 Oct. 2022 in Germany, the disclosure of which is incorporated herein by reference in its entirety.

The present disclosure relates to a linear actuator, in particular a linear actuator having a threaded drive, which comprises a threaded nut connected to a cantilever tube and a leadscrew coupled or couplable to a motor for torque transfer so that, by a rotation of the leadscrew, the threaded nut and the cantilever tube are linearly movable. A first end of the leadscrew projects into the cantilever tube, regardless of the position of the cantilever tube, and is connected to a piston. The piston divides an internal space formed by means of the cantilever tube into two regions, the first being formed on the side of the piston opposite the threaded nut and the second being formed on the side of the piston facing the threaded nut such that the first and second regions are separated from one another in a fluidically sealed manner.

BACKGROUND

The length of the linear actuators of the aforementioned design is variable. In a maximally extended state, the linear actuator has its maximum length, which is measured in particular between two joints arranged on opposite sides of the linear actuator, in particular their joint centers. In a maximally retracted state, the linear actuator has its minimum length.

DE 10 2020 212 703 A1 discloses a linear actuator with a spindle end support designed as a piston, which seals the interior of the cantilever tube and divides it into the first region formed on the side of the piston opposite the threaded nut and the second region formed on the side of the piston facing the threaded nut. A lubricating oil is arranged in the second region in order to lubricate and/or cool the leadscrew, which is preferably formed as a planetary leadscrew. The cantilever tube comprises a ventilation aperture at the end facing away from the housing and thus adjacent to the first region of the interior space, so that the pressure outside the linear actuator prevails in the first region of the interior space, regardless of the position of the cantilever tube. The second region of the internal space is partially filled with the lubricating oil, wherein it is otherwise filled with a gas. With the compressible gas, the volume change of the second region can be taken into account. The fluidically sealed piston prevents the lubricating oil from leaking out of the linear actuator. The second region of the internal space is preferably closed in a fluidically sealed manner. It is in contrast conceivable that the second region be connected to the environment in a fluidically exchanging manner via a valve, the valve being designed such that it sets the upper limit of a pressure in the second region, whereby no liquid is permitted to pass.

Given that the second region is surrounded by the housing in a plurality of positions of the cantilever tube, such a valve design can only be implemented with a high design effort, because a flow connection from the second region, which is formed by means of the movable cantilever tube, and the housing, which is fixed by contrast, must be designed for connection of the valve. Further, axial impacts or generally high axial forces on the linear actuator can negatively impact the function of the threaded drive. Such axial impacts or high axial forces can cause the threaded drive to be damaged or the lubricating oil to be pushed away from the contact surfaces between the leadscrew and threaded nut, so that sufficient lubrication is then no longer ensured.

Furthermore, electrically and hydraulically operable linear actuators are known from the prior art, in which the threaded nut of the linear actuator is used as a piston for hydraulic relief. The electric motor used in order to drive the leadscrew is typically arranged outside the housing of the linear actuator in order to enable a simple hydraulic exposure of the threaded nut, which is designed as a piston, from both sides.

Various combinations of separately arranged electric and hydraulic linear actuators for moving a movement mechanism, e.g. an excavator arm, are known from CN 107089629 B and CN 108755794 B. Each electrical or hydraulic cylinder comprises a separate housing.

Overall, a large design space is necessary for such a combination of multiple linear actuators. Furthermore, the electrical and hydraulic linear actuators engage with the moving mechanism at various bearing points, so that transverse forces can arise between the linear actuators due to the distances formed between the bearing points.

SUMMARY

The object of the present disclosure is to provide a linear actuator that reduces or eliminates the problems of the prior art. In particular, relief of the threaded drive is intended to be improved.

Said object achieved by means of a linear actuator according to the disclosure.

Further advantageous embodiments are the subject matter of the disclosure.

Specifically, said object is achieved by the first region of the internal space of the cantilever tube being connected to a first pressure source, in particular a pressure accumulator, in order to be able to generate a certain relief pressure in the first region by means of the first pressure source.

The relief pressure acts in an advantageous manner, substantially in the axial direction, on the leadscrew and/or the piston connected to the leadscrew. The threaded drive is thus particularly well resilient against such forces, which act on the threaded drive in this axial direction, but opposite to the force generated by means of the relief pressure. By the relief of the threaded drive, the linear actuator can be subjected to higher forces from the outside, in particular impacts, without the threaded drive suffering damage. In particular, typical damage such as scuffing can be successfully avoided. The connection of the first region to the first pressure source is furthermore easy to implement in terms of design, because a small part of the cantilever tube still projects out of the housing even in a maximally retracted state of the linear actuator, in which case the connection is then preferably performed in this region, which protrudes from the housing. The first region is preferably connected to the first pressure source by means of a hose, in order to be able to compensate for the movement of the cantilever tube.

Preferably, the threaded nut or components adjacent thereto is/are designed as a fluidically sealed annular piston, or the threaded nut comprises such a fluidically sealed annular piston which separates an annular fluid space formed between a housing of the linear actuator and the cantilever tube in a fluidically sealed manner.

In the region in which it projects from the housing, the cantilever tube is preferably guided by means of a slide bearing in the housing. The annular fluid space is then separated on the side opposite the annular piston by means of such a slide bearing, which is also designed to be fluidically sealed.

In a further embodiment of the linear actuator, the annular fluid space can be pressurized, preferably by means of a second pressure source.

The threaded nut can therefore also be pressurized in order to relieve the threaded drive. The pressure acts in an advantageous manner on the threaded nut or the annular piston, substantially in the axial direction. The threaded drive can thus be particularly well relieved from such forces, which act on the threaded drive in this axial direction, but opposite to the force generated by means of the pressure. The connection of the annular fluid space to the second pressure source is furthermore easy to implement in terms of design, because this connection can be made on an outer circumference of the housing and because there is still no relative movement between the housing and the second pressure source in the operation of the linear actuator.

Advantageously, the linear actuator can be operated in the following four quadrants:
  in a first quadrant, the cantilever tube is extended out of the housing by means of energy provided by the motor counter to a force acting on the cantilever tube towards the housing;
  in a second quadrant, the cantilever tube is retracted into the housing by means of a force acting on the cantilever tube towards the housing, while in the meantime energy can be recuperated by means of the motor;
  in a third quadrant, the cantilever tube is retracted into the housing by means of energy provided by the motor counter to a force acting on the cantilever tube away from the housing;
  in a fourth quadrant, the cantilever tube is extended out of the housing by means of a force acting on the cantilever tube away from the housing, while in the meantime energy can be recuperated by means of the motor.

The linear actuator is thus particularly flexible, i.e., it can be used in an especially large range of operating states, whereby each quadrant represents a portion of the entire range of operating states. The motor is preferably designed as an electric motor. Such an electric motor is further preferably arranged in the housing of the linear actuator. Such an electric motor is also operable as a generator, in particular such that power can be generated in the second and fourth quadrants during operation of the linear actuator.

Further preferably, the first region can be pressurized by the relief pressure by means of the first pressure source and a control device of the linear actuator during operation of the linear actuator in the first and second quadrants in order to reduce a contact force acting between the leadscrew and the threaded nut.

In a further preferred embodiment of the linear actuator, the annular fluid space can be pressurized during operation of the linear actuator in the third and fourth quadrants by means of the control device and preferably by means of the second pressure source in order to reduce the contact force acting between the leadscrew and the threaded nut.

Thus, it is ensured that, in all four quadrants, the threaded drive is relieved and the forces generated by means of the pressures on the leadscrew or the threaded nut act counter to the force acting "from the outside" on the threaded drive via the cantilever tube.

Preferably, a dampening element for dampening axial impacts is arranged at the end of the cantilever tube facing away from the housing and between the end of the cantilever tube facing away from the housing and a ball joint, the joint center point of which coincides with the longitudinal axis of the leadscrew.

Thus, the protection of the linear actuator against axial impacts is further improved. The dampening element is preferably designed as a mechanical dampening element having at least one annular spring package, in which the impact energy is converted into heat by friction between abutting rings.

Preferably, the end of the cantilever tube facing away from the housing is fixedly connected to a support element passing by the dampening element, or the end of the cantilever tube facing away from the housing comprises such a support element. The support element comprises a sliding block movably supported in a longitudinal direction for receiving a bolt passing through a joint head of the ball joint, such that the cantilever tube can be supported on the bolt with respect to rotation about the longitudinal axis of the leadscrew.

As a result of the movement of the sliding block, the bolt is also movable in the axial direction when the dampening element is compressed due to axial forces. The support of the cantilever tube is maintained in each position of the bolt. This support is necessary in order to enable the relative movement between the leadscrew and the assembly consisting of the threaded nut and the cantilever tube. One could thus also say that the use of the dampening element is enabled only by the bolt that is movable by means of the sliding block.

In a preferred embodiment of the linear actuator, the leadscrew is coupled to a hollow shaft of the motor designed as an electric motor via a rotationally fixed connection.

The hollow shaft, the rotationally fixed connection, and the leadscrew preferably form a non-bending, rotatable assembly, the bearing of which can only be performed with two bearing points in the housing due to the non-bending design.

Further preferably, in a (maximally) retracted state of the cantilever tube, the threaded nut is preferably arranged at least partially, preferably completely, inside the hollow shaft.

Because, in the retracted state, the threaded nut is surrounded by the hollow shaft and in turn by coils of the electric motor, the axial design space of the electric motor is used for the stroke of the linear actuator, i.e. the cantilever tube can be further retracted. Thus, the ratio of the length of the linear actuator in the extended state to its length in the retracted state is maximized.

In a further alternative embodiment of the linear actuator, a holding brake for the leadscrew and a first rotary bearing for bearing the leadscrew on a housing of the linear actuator are arranged inside the hollow shaft.

In this way, a particularly compact arrangement of the holding brake, the first rotary bearing, and the hollow shaft with respect to one another is achieved. In particular, these components can be arranged on a particularly short axial design length. In particular, an axial design length of the electromechanical linear actuator in the maximally retracted state is thus minimized. It could also be said that the design length of the electric motor is then not considered in the design length of the linear actuator. The arrangement of the holding brake and the first rotary bearing within the hollow shaft means that the holding brake and the first rotary bearing are at least partially, preferably completely, facing an inner circumference of the hollow shaft with their outer circumference. It could also be said that the holding brake and the first rotary bearing are at least partially, preferably completely, arranged between two opposed front faces of the hollow shaft. The hollow shaft is preferably part of a rotor of the electric motor and thus comprises permanent magnets or coils on its outer circumference. The housing of the linear actuator is preferably also designed as the housing of the electric motor, and thus comprises coils or permanent magnets on its inner circumference. The electric motor can be designed in a variety of ways.

In summary, such a linear actuator is suitable for a variety of applications, such as for the movement of parts of an excavator arm or telescopic handler.

BRIEF DESCRIPTION OF THE DRAWINGS

Preferred embodiments are described in further detail hereinafter with reference to the accompanying drawings.

FIG. 1b shows a schematic cross-sectional view of the linear actuator according to FIG. 1a.

FIG. 2b is a schematic cross-sectional view of the linear actuator of FIG. 2a.

DETAILED DESCRIPTION

The linear actuator 1 comprises, among other things, a threaded drive 2, which comprises a threaded nut 3 connected to a cantilever tube 3a and a leadscrew 4 coupled or couplable to a motor EM for torque transfer so that, by a rotation of the leadscrew 4, the threaded nut 3 and the cantilever tube 3a are linearly movable. A first end $4._{E1}$ of the leadscrew 4 projects into the cantilever tube 3a, regardless of the position of the cantilever tube 3a, and is connected to a piston K. The second end of the leadscrew 4 opposite the first end $4._{E1}$ bears reference sign $4._{E2}$. The piston K divides an internal space IR formed by means of the cantilever tube 3a into two regions $IR_{B1}$, $IR_{B2}$, the first being formed on the side of the piston K opposite the threaded nut 3 and the second being formed on the side of the piston K facing the threaded nut 3 such that the first and second regions $IR_{B1}$, $IR_{B2}$ are separated from one another in a fluidically sealed manner.

The piston K comprises a groove on its outer circumference for receiving at least one sealing ring. By means of the sealing ring, preferably an O-ring or R-ring, the sealing gap formed between the piston K and the cantilever tube 3a can be particularly well sealed. The end of the cantilever tube 3a facing away from the threaded nut 3 is preferably sealed by means of a plug.

The first region $IR_{B1}$ of the internal space IR of the cantilever tube 3a is connected to a first pressure source $DQ_1$, in particular a pressure accumulator, in order to be able to generate a certain relief pressure in the first region $IR_{B1}$ by means of the first pressure source $DQ_1$.

Figure 1A:
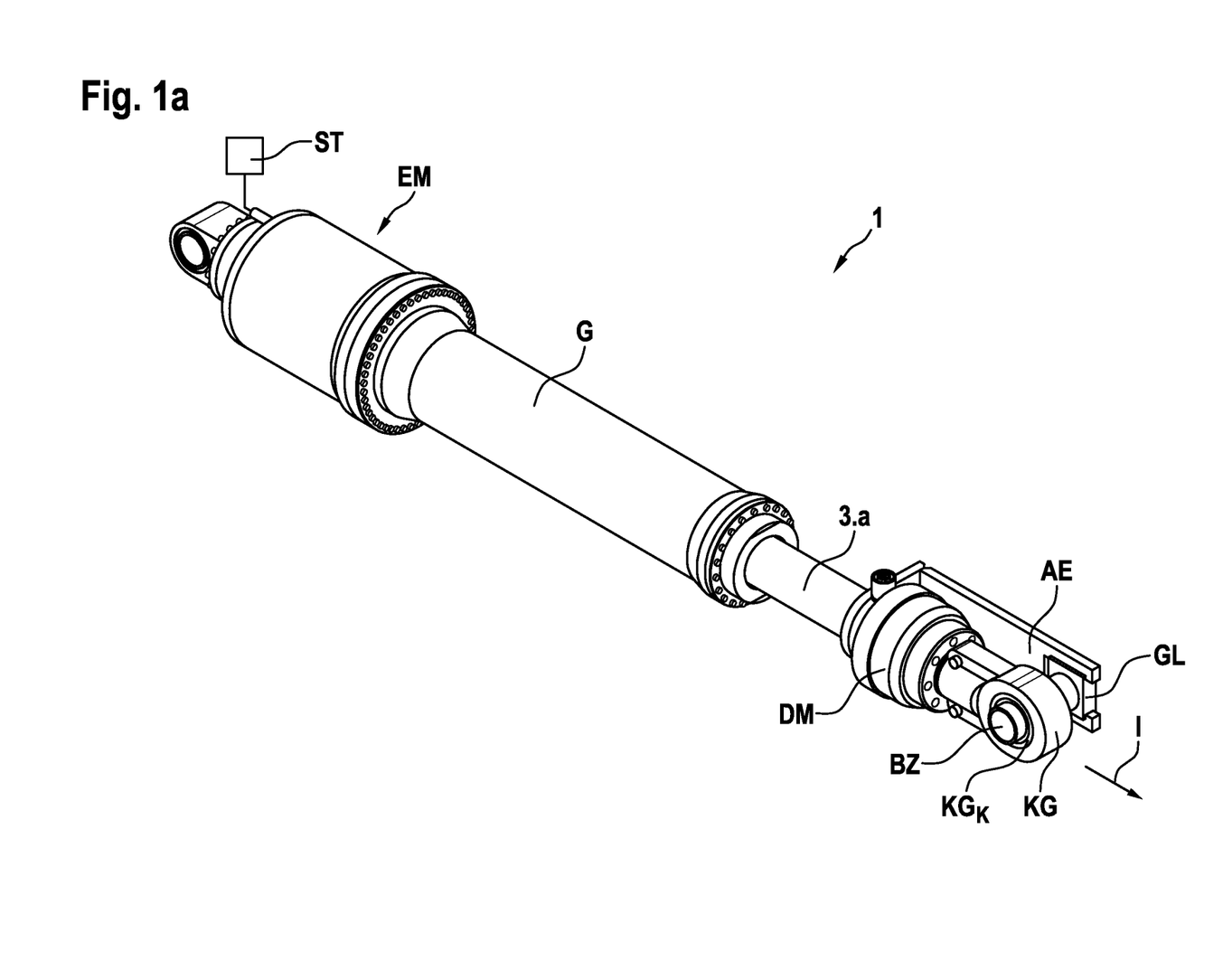
FIG. 1a schematically shows a linear actuator according to a first embodiment of the disclosure in a three-dimensional view.
Figure 1B:
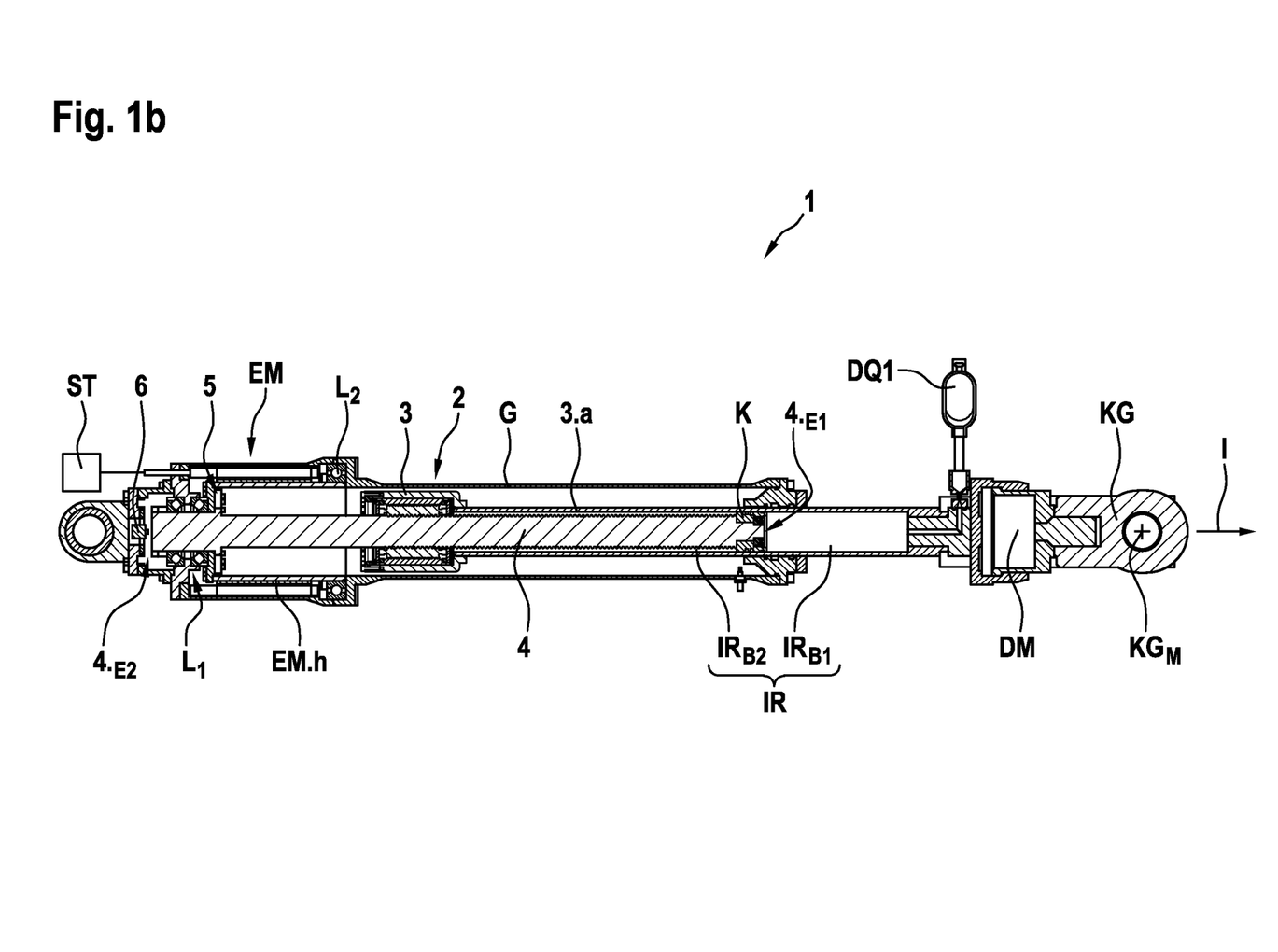
Figure 2A:
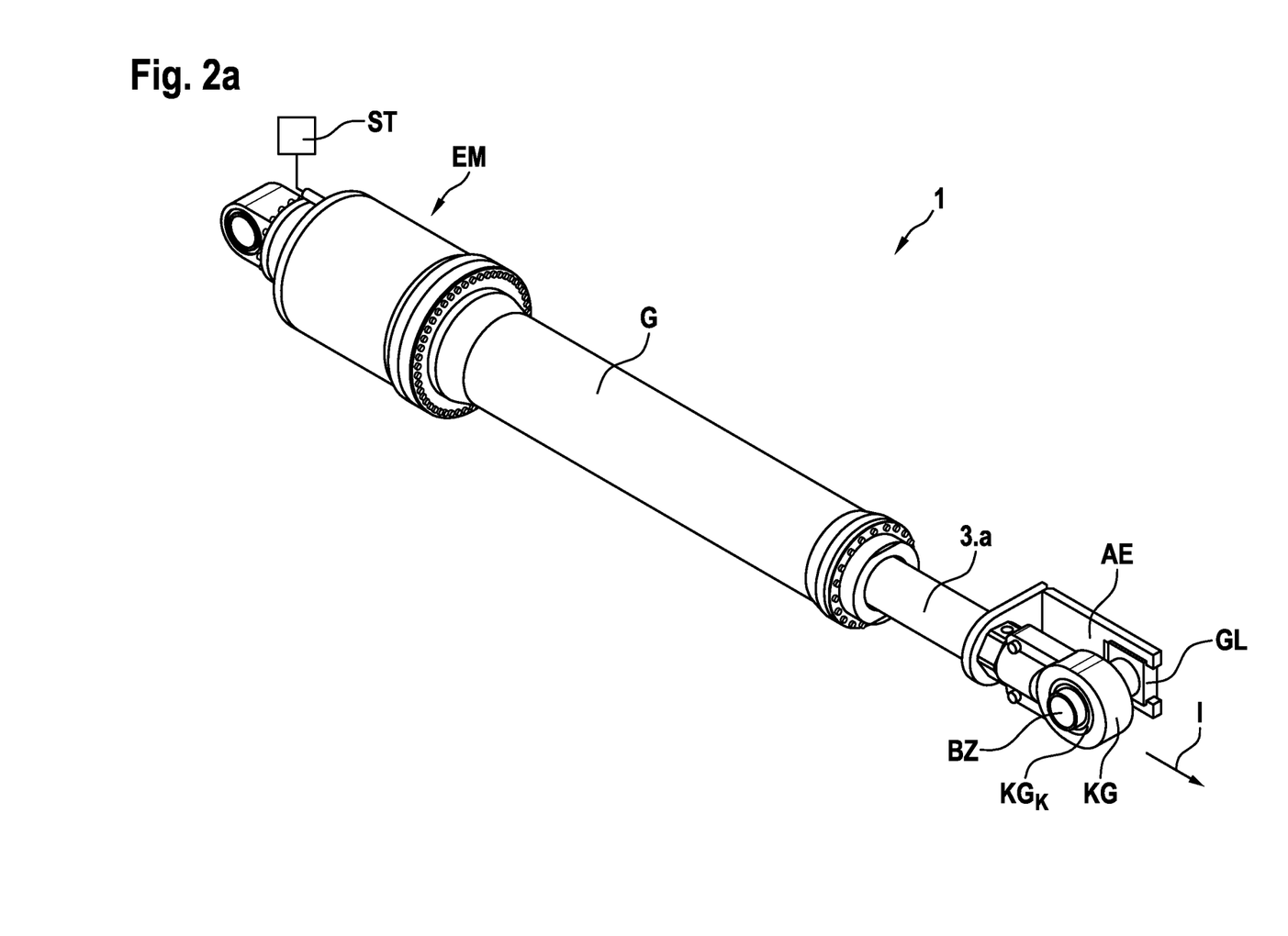
FIG. 2a schematically shows a linear actuator according to a second embodiment of the disclosure in a three-dimensional view.
Figure 2B:
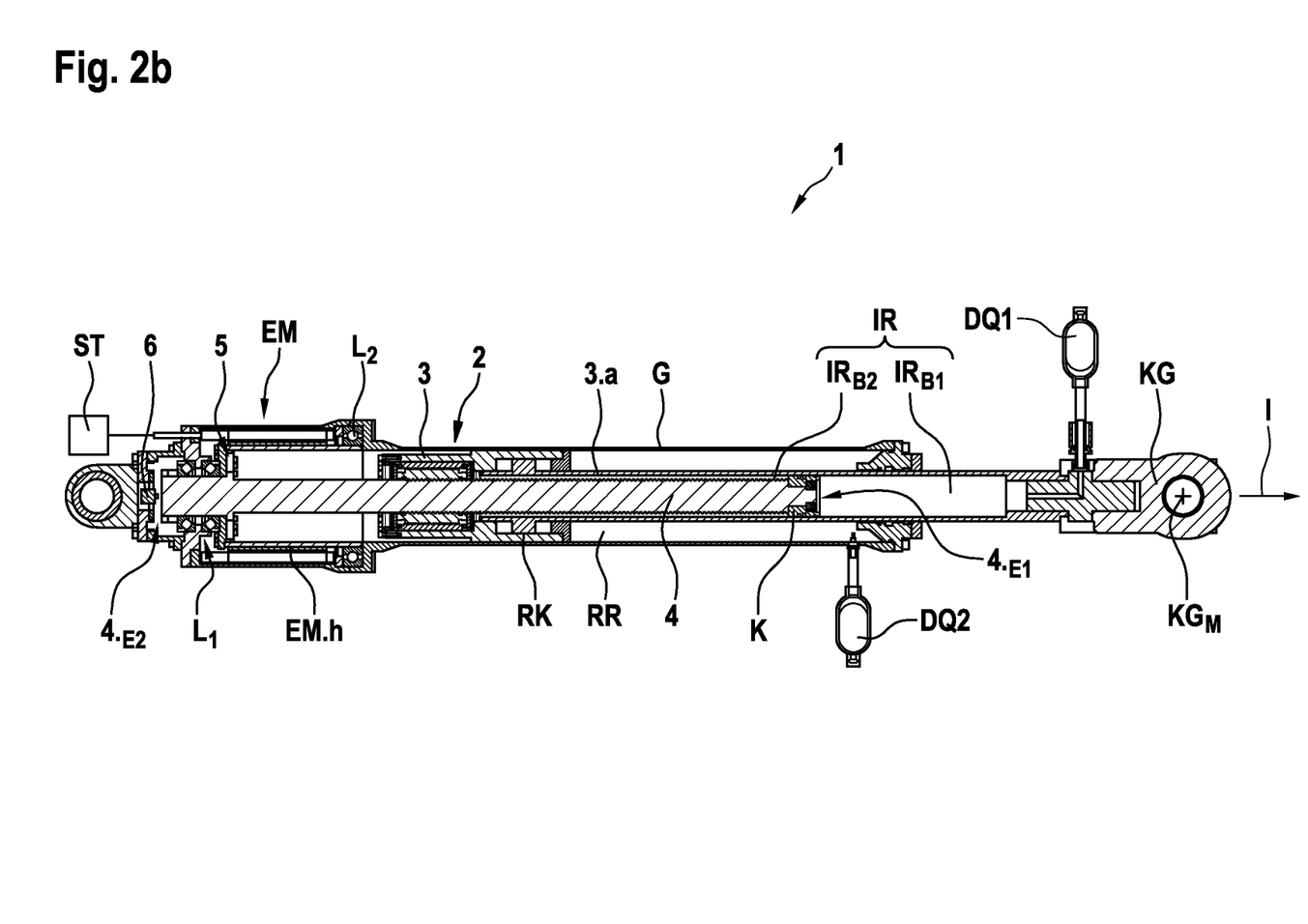

This first pressure source $DQ_1$ is shown in particular in FIGS. 1b and 2b. FIGS. 1a, 2a, 3, and 4 do not show the first pressure source $DQ_1$ for reasons of clarity. The first pressure source $DQ_1$ can be designed in a variety of ways, in particular as a pressure accumulator. The first pressure source $DQ_1$ can also be designed with the aid of valves and/or pumps in order to then change the relief pressure by means of such valves and/or pumps. During a retraction of the cantilever tube 3a, a pressurized fluid from the first region $IR_{B1}$ flows towards the first pressure source $DQ_1$. During the extension of the cantilever tube 3a, a pressurized fluid flows from the first pressure source $DQ_1$ to the first region $IR_{B1}$. By means of the first pressure source $DQ_1$, a constant relief pressure can be generated in the first region $IR_{B1}$, in particular. In the second region $IR_{B2}$, there could be a lubricating fluid for lubricating and/or cooling the threaded drive 2, wherein a mixing of lubricating fluid and pressurized fluid is then avoided, in particular by means of piston K.

According to the second exemplary embodiment of the linear actuator 1, and in particular as seen in FIG. 2b, the threaded nut 3 or components adjacent thereto is/are designed as a fluidically sealed annular piston RK, or the threaded nut 3 comprises a fluidically sealed annular piston RK. The annular piston RK separates an annular fluid space RR formed between a housing G of the linear actuator 1 and the cantilever tube 3a in a fluidically sealed manner. According to FIG. 2b, the annular piston RK is formed by means of an adapter arranged between the threaded nut 3 and the cantilever tube 3a.

On the end facing away from the annular piston RK, the annular fluid space RR is in particular limited by means of a slide bearing (not further described), by means of which the cantilever tube 3.a is furthermore borne in the housing G.

According to FIG. 2b, the annular fluid space RR can be pressurized by means of a second pressure source $DQ_2$.

The second pressure source $DQ_2$ is not shown in FIG. 2a for reasons of clarity. Adjacent to the annular fluid space RR, the second pressure source $DQ_2$ is connected to an outer circumference of the housing G. The second pressure source $DQ_2$ can be designed in a variety of ways, e.g., also as a further pressure accumulator. The second pressure source $DQ_2$ can also be designed with the aid of valves and/or pumps. During a retraction of the annular piston RK, a pressurized fluid flows from the second pressure source $DQ_2$ to the annular fluid space RR. During the extension of the annular piston RK, a pressurized fluid flows from the annular fluid space RR towards the second pressure source $DQ_2$. By means of the second pressure source $DQ_2$, a constant pressure in the annular fluid space RR can be generated, in particular. The first pressure source $DQ_1$ and the second pressure source $DQ_2$ are fluidically separated from one another according to FIG. 2b, so that the pressurized fluid present in the annular fluid space RR does not come into contact with the pressurized fluid present in the first region $IR_{B1}$. However, it is also conceivable that the first pressure source $DQ_1$ and the second pressure source $DQ_2$ are fluidically coupled to one another.

Figure 4:
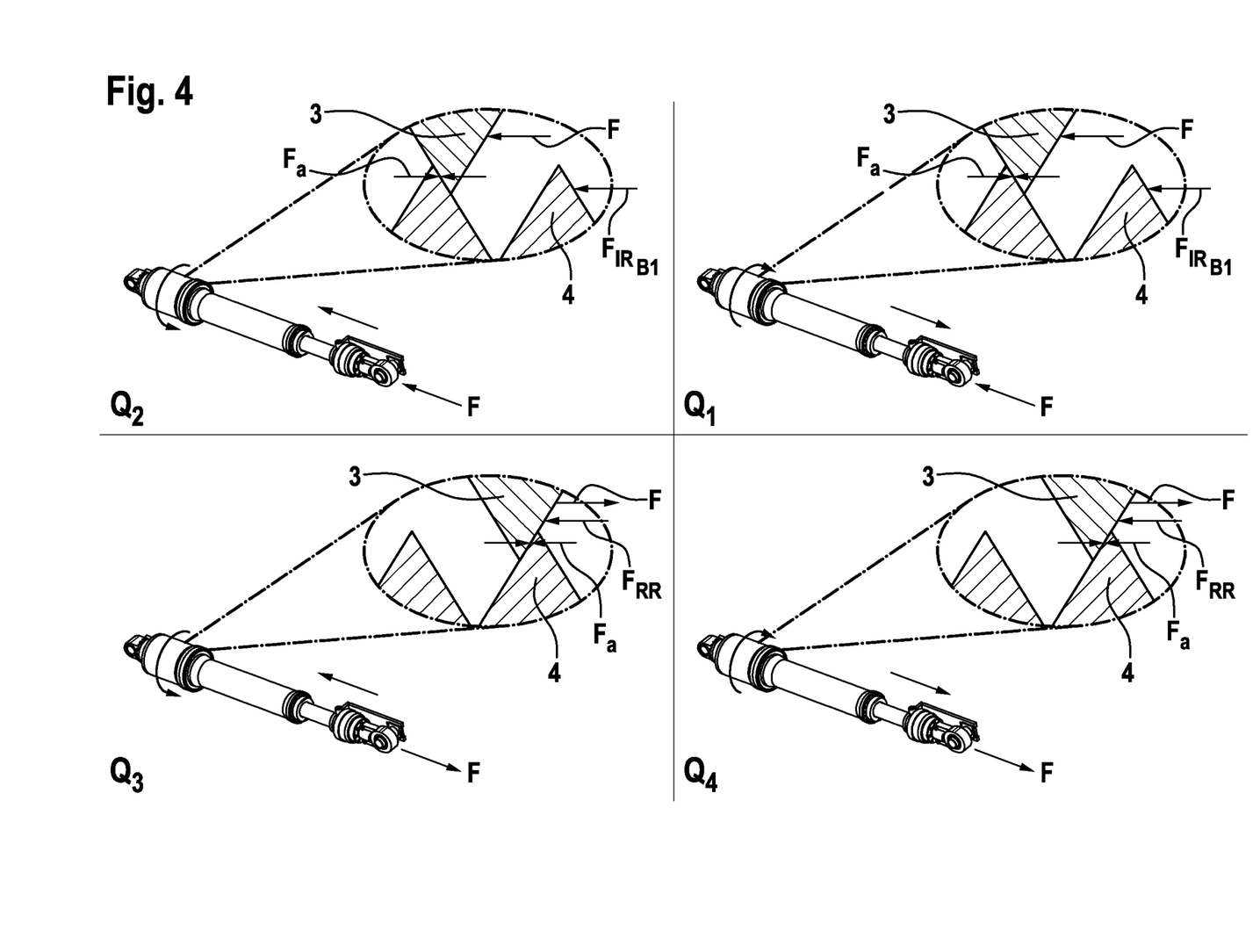
FIG. 4 schematically shows the second embodiment of the linear actuator of FIG. 2a with associated loads in four different quadrants.

FIG. 4 schematically shows the second embodiment of the linear actuator of FIG. 2a with associated loads in four different quadrants.

The linear actuator 1 can be operated in the following four quadrants $Q_1$, $Q_2$, $Q_3$, $Q_4$:

in a first quadrant $Q_1$, the cantilever tube 3a is extended out of the housing G by means of energy provided by the motor EM counter to a force F acting on the cantilever tube 3a towards the housing G;

in a second quadrant $Q_2$, the cantilever tube 3a is retracted into the housing G by means of a force F acting on the cantilever tube 3*a* towards the housing G, while in the meantime energy can be recuperated by means of the motor EM;

in a third quadrant $Q_3$, the cantilever tube 3*a* is retracted into the housing G by means of energy provided by the motor EM counter to a force F acting on the cantilever tube 3*a* away from the housing G;

in a fourth quadrant $Q_4$, the cantilever tube 3*a* is extended out of the housing G by means of a force F acting on the cantilever tube 3*a* away from the housing G, while in the meantime energy can be recuperated by means of the motor EM.

The first region $IR_{B1}$ can be pressurized with the relief pressure by means of the first pressure source $DQ_1$ and a control device ST of the linear actuator 1 during operation of the linear actuator 1 in the first and second quadrants $Q_1$, $Q_2$ in order to reduce a contact force Fa acting between the leadscrew 4 and the threaded nut 3.

The control device ST is coupled to the first pressure source $DQ_1$ accordingly. The motor EM, which is preferably designed as an electric motor, is also coupled to the control device ST for its control and/or adjustment. The motor EM and thus the leadscrew 4 rotate in the first and second quadrants $Q_1$, $Q_2$ in the opposite direction of rotation, which is indicated by correspondingly curved arrows. In order to represent the load situation on the threaded drive 2, one thread of the threaded nut 3 and two adjacent threads of the leadscrew 4, which are engaged with one another, are shown for each quadrant $Q_1$ to $Q_4$. If planetary gears are intended be interposed between the threaded nut 3 and the leadscrew 4, this does not change the general load situation. The contact force Fa acts at the points where the threaded nut 3 and the leadscrew 4 contact. If planetary gears are intended to be interposed between the threaded nut 3 and the leadscrew 4, this does not change the basic load situation, because the corresponding forces are transmitted by means of such planetary gears. The force F acting on the cantilever tube 3*a* in the first and second quadrants $Q_1$, $Q_2$ towards the housing G is transmitted the threaded nut 3 and can be divided onto a plurality of threads, depending on the circumstances. The direction shown to the left here remains unchanged. The force $F_{IRB1}$ resulting from the pressure in the first region $IR_{B1}$ of the internal space IR acts in the same direction as force F. However, given that it engages with the leadscrew 4 and not the threaded nut 3, contact force Fa is reduced by force $F_{IRB1}$. In order to maintain the contact between the leadscrew 4 and the threaded nut 3 and to enable a uniform extension or retraction of the cantilever tube 3*a*, a pressure is adjusted by means of the control device ST, which causes force $F_{IRB1}$ to be less than force F.

The annular fluid space RR can be pressurized during operation of the linear actuator 1 in the third and fourth quadrants $Q_3$, $Q_4$ by means of the control device ST and preferably by means of the second pressure source $DQ_2$ in order to reduce the contact force Fa acting between the leadscrew 4 and the threaded nut 3.

The control device ST is coupled to the second pressure source $DQ_2$ accordingly. The motor EM and thus the leadscrew 4 rotate in the third and fourth quadrants $Q_3$, $Q_4$ in the opposite direction of rotation, which is indicated by correspondingly curved arrows. The force F acting on the cantilever tube 3*a* in the third and fourth quadrants $Q_3$, $Q_4$ away from the housing G is transmitted to the threaded nut 3 and can in some situations be divided onto a plurality of threads. The direction (in this case shown to the right) remains unchanged in this case. The force FRR resulting from the pressure in the annular fluid space RR acts in the direction counter to the force F, i.e., in the present case to the left, and also engages with the threaded nut 3, so that the contact force Fa is reduced by force FRR. In order to maintain the contact between the leadscrew 4 and the threaded nut 3 and to enable a uniform extension or retraction of the cantilever tube 3*a*, a pressure is adjusted by means of the control device ST, which causes the force FRR to be less than the force F.

In principle, the illustration in FIG. 4 also applies to the first embodiment of the linear actuator 1 according to FIG. 1*a*, but the force FRR resulting from the pressure in the annular fluid space RR shown in the third quadrant $Q_3$ and the fourth quadrant $Q_4$ cannot be generated by means of the first embodiment of the linear actuator 1.

Accordingly, the second embodiment of the linear actuator 1 is more suitable for being operated in third quadrant $Q_3$ and fourth quadrant $Q_4$.

However, the first embodiment of the linear actuator 1 shown in FIGS. 1*a* and 1*b* comprises a damping element DM. For dampening axial impacts, the dampening element DM is arranged at the end of the cantilever tube 3*a* facing away from the housing G and between the end of the cantilever tube 3*a* facing away from the housing G and a ball joint KG. A joint center point KGM of the ball joint KG coincides with the longitudinal axis of the leadscrew 4.

According to FIGS. 1*a* and 1*b*, the end of the cantilever tube 3*a* facing away from the housing G is fixedly connected to a support element AE passing by the dampening element DM or comprises such a support element AE. The support element AE comprises a sliding block GL movably supported in a longitudinal direction 1 for receiving a bolt BZ passing through a joint head $KG_K$ of the ball joint KG, such that the cantilever tube 3*a* can be supported on the bolt BZ with respect to rotation about the longitudinal axis of the leadscrew 4.

The second exemplary embodiment of the linear actuator 1 according to FIGS. 2*a* and 2*b* also comprises a ball joint KG arranged on the end of the cantilever tube 3*a* facing away from the housing G and an associated support element AE. Also according to FIGS. 2*a* and 2*b*, the support element AE comprises a sliding block GL movably supported in a longitudinal direction 1 for receiving a bolt BZ passing through a joint head $KG_K$ of the ball joint KG, such that the cantilever tube 3*a* can be supported on the bolt BZ with respect to rotation about the longitudinal axis of the leadscrew 4. The sliding block GL could also be omitted in the second exemplary embodiment of the linear actuator 1 because no movements, or only very small movements, of the bolt BZ in the longitudinal direction of the linear actuator 1 are expected due given the lack of a damping element.

The leadscrew 4 is coupled to a hollow shaft EM.h of the motor EM designed as an electric motor via a rotationally fixed connection 5.

Due to the rigid design, the bearing of the rotating assembly consisting of leadscrew 4, the rotationally fixed connection 5, and the hollow shaft EM.h can only be performed using two bearing points, i.e., a first rotary bearing $L_1$ and a second rotary bearing $L_2$.

A rotary encoder 6 is arranged on a front face of the leadscrew 4 facing away from the cantilever tube 3*a*, i.e., at the second end $4._{E2}$ of the leadscrew 4.

The rotary encoder 6 is preferably designed as an absolute rotary encoder. A position determination of the cantilever tube 3*a* is thereby possible without a distance measuring system.

As shown in FIGS. 1*b* and 2*b*, in a maximally retracted state of the cantilever tube 3.*a*, the threaded nut 3 is preferably arranged at least partially, preferably completely, inside the hollow shaft EM.h.

FIGS. 1b and 2b show the threaded nut 3 adjacent to the hollow shaft EM.h, but also not in the maximally retracted state. The threaded nut 3 could be moved even further to the left by corresponding further rotation of the leadscrew 4 according to the position shown in FIGS. 1b and 2b.

Figure 3:
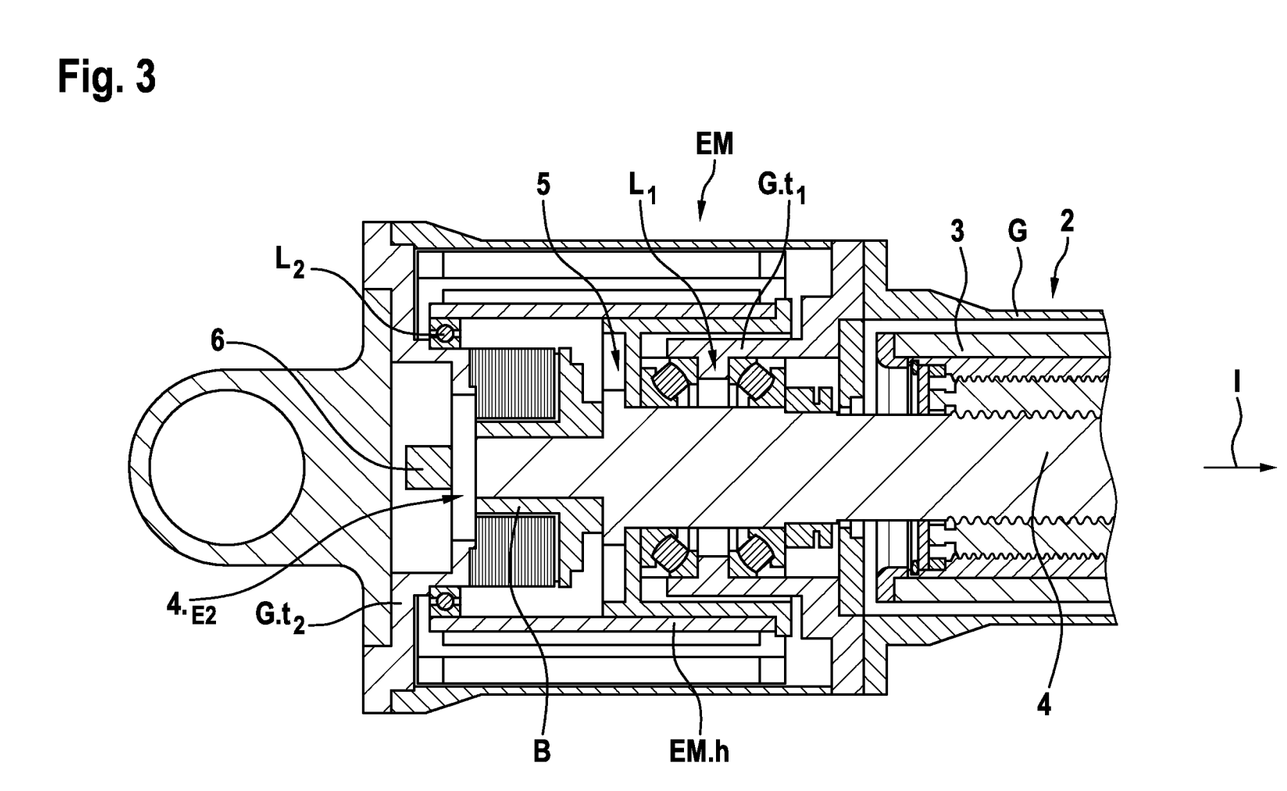
FIG. 3 shows, in a schematic cross-sectional view, a further embodiment of a bearing of an electric motor and a cut-out of the threaded drive of the linear actuator.

FIG. 3 shows a schematic cross-sectional view of a further embodiment of a bearing of an electric motor EM and a cut-out of the threaded drive 2 of the linear actuator 1. The omitted components can accordingly be carried over from the first and second exemplary embodiments of the linear actuator 1.

According to FIG. 3, a holding brake B for the leadscrew 4 and the first rotary bearing $L_1$ for bearing the leadscrew 4 on the housing G of the linear actuator 1 are arranged inside the hollow shaft EM.h. By contrast, the first rotary bearing $L_1$ is arranged laterally adjacent the hollow shaft EM.h shown in FIGS. 1b and 2b.

A length of the linear actuator 1 in the maximally retracted state is minimized in that the holding brake B and the first rotary bearing $L_1$ are arranged within the hollow shaft EM.h.

As shown in FIG. 3, the housing G comprises a first hollow support $G.t_1$, which projects into the hollow shaft EM.h of the electric motor EM and whose inner circumference is used to receive the first rotary bearing $L_1$ arranged on the outer circumference of the leadscrew 4.

Shown in FIG. 3 is a second rotary bearing $L_2$ arranged between the outer circumference of a second hollow support $G.t_2$ of the housing G projecting into the hollow shaft EM.h of the electric motor EM and the inner circumference of the hollow shaft EM.h in an end region of the electric motor EM facing away from the cantilever tube 3a. By contrast, as shown in FIGS. 1b and 2b, the second rotary bearing $L_2$ is arranged on the outer circumference of the hollow shaft EM.h.

The first rotary bearing $L_1$ comprises two tapered roller bearings, preferably in an O-assembly. The second rotary bearing $L_2$ comprises a radial groove ball bearing. The first rotary bearing $L_1$ is designed as a fixed bearing, and the second rotary bearing $L_2$ is designed as a floating bearing.

LIST OF REFERENCE SIGNS

1 Linear actuator
2 Threaded drive
3 Threaded nut
3.a Cantilever tube
4 Leadscrew
$4._{E1}$ First end of the leadscrew 4
$4._{E2}$ Second end of the leadscrew 4
5 Rotationally fixed connection
6 Rotary encoder
EM Electric motor
EM.h Hollow shaft
K Piston
IR Internal space
$IR_{B1}$ First region of the internal space IR
$IR_{B2}$ Second region of the internal space IR
$DQ_1$ First pressure source
$DQ_2$ Second pressure source
RK Annular piston
G Housing
RR Annular fluid space
$Q_1$ First quadrant
$Q_2$ Second quadrant
$Q_3$ Third quadrant
$Q_4$ Fourth quadrant
F Force
$F_a$ Contact force
$F_{IRB1}$ Force resulting from the pressure in the first region $IR_{B1}$ of the internal space IR
FRR Force resulting from the pressure in the annular fluid space RR
ST Control device
DM Dampening element
KG Ball joint
$KG_M$ Joint center
$KG_K$ Joint head
AE Support element
GL Sliding block
BZ Bolt
B Holding brake
$L_1$ First rotary bearing
$L_2$ Second rotary bearing
$G.t_1$ First hollow support
$G.t_2$ Second hollow support
l Longitudinal direction

What is claimed is:

1. A linear actuator, comprising:
a threaded drive which comprises a threaded nut connected to a cantilever tube and a leadscrew coupled or couplable to a motor for torque transmission, such that by a rotation of the leadscrew the threaded nut and the cantilever tube are linearly movable, and, regardless of the position of the cantilever tube, a first end the leadscrew projects into the cantilever tube and is connected to a piston which divides an internal space formed by the cantilever tube into a first and second region, the first region formed on a side of the piston opposite the threaded nut and the second region formed on a side of the piston facing the threaded nut such that the first and second regions are separated from one another in a fluidically sealed manner,
wherein the first region of the internal space of the cantilever tube is connected to a first pressure source in the form of a pressure accumulator, and configured to generate a certain relief pressure in the first region using the first pressure source, and
wherein the threaded nut or components adjacent thereto is/are designed as fluidically sealed annular pistons, or the threaded nut comprises a fluidically sealed annular piston which separates an annular fluid space formed between a housing of the linear actuator and the cantilever tube in a fluidically sealed manner.

2. The linear actuator according to claim 1, wherein the annular fluid space is configured to be pressurized using a second pressure source.

3. The linear actuator according to claim 1, wherein the leadscrew is coupled to a hollow shaft of the motor, which is designed as an electric motor, via a rotationally fixed connection.

4. The linear actuator according to claim 3, wherein, in a maximally retracted state of the cantilever tube the threaded nut is arranged at least partially inside the hollow shaft.

5. The linear actuator according to claim 3, wherein a holding brake for the leadscrew and a first rotational bearing for bearing the leadscrew on the housing of the linear actuator are arranged inside the hollow shaft.

6. A linear actuator, comprising:
a threaded drive which comprises a threaded nut connected to a cantilever tube and a leadscrew coupled or couplable to a motor for torque transmission, such that by a rotation of the leadscrew the threaded nut and the cantilever tube are linearly movable, and, regardless of the position of the cantilever tube, a first end the leadscrew projects into the cantilever tube and is connected to a piston which divides an internal space formed by the cantilever tube into a first and second region, the first region formed on a side of the piston opposite the threaded nut and the second region formed on a side of the piston facing the threaded nut such that the first and second regions are separated from one another in a fluidically sealed manner, wherein the first region of the internal space of the cantilever tube is connected to a first pressure source in the form of a pressure accumulator, and configured to generate a certain relief pressure in the first region using the first pressure source, wherein the linear actuator is configured to be operated in the following four quadrants;

in a first quadrant wherein the cantilever tube is extended out of the housing using energy provided by the motor counter to a force acting on the cantilever tube toward the housing;

in a second quadrant wherein the cantilever tube is retracted into the housing using a force acting on the cantilever tube towards the housing while in the meantime energy is recuperated using the motor (EM);

in a third quadrant wherein the cantilever tube is retracted into the housing using energy provided by the motor counter to a force acting on the cantilever tube away from the housing; and in a fourth quadrant wherein the cantilever tube is extended out of the housing using a force acting on the cantilever tube away from the housing while in the meantime energy is recuperated using the motor.

7. The linear actuator according to claim 6, wherein the first region is configured to be pressurized with the relief pressure using the first pressure source and a control device of the linear actuator during operation of the linear actuator in the first and second quadrants to reduce a contact force acting between the leadscrew and the threaded nut.

8. The linear actuator according to claim 6, wherein;

the threaded nut comprises a fluidically sealed annular piston which separates an annular fluid space formed between a housing of the linear actuator and the cantilever tube in a fluidically sealed manner; and the annular fluid space is configured to be pressurized using the control device and a second pressure source, different from said first pressure source, during operation of the linear actuator in the third and fourth quadrants to reduce a contact force acting between the leadscrew and the threaded nut.

9. A linear actuator, comprising:

a threaded drive which comprises a threaded nut connected to a cantilever tube and a leadscrew coupled or couplable to a motor for torque transmission, such that by a rotation of the leadscrew the threaded nut and the cantilever tube are linearly movable, and, regardless of the position of the cantilever tube, a first end the leadscrew projects into the cantilever tube and is connected to a piston which divides an internal space formed by the cantilever tube into a first and second region, the first region formed on a side of the piston opposite the threaded nut and the second region formed on a side of the piston facing the threaded nut such that the first and second regions are separated from one another in a fluidically sealed manner, wherein the first region of the internal space of the cantilever tube is connected to a first pressure source in the form of a pressure accumulator, and configured to generate a certain relief pressure in the first region using the first pressure source, wherein a dampening element configured to dampen axial impacts is arranged at the end of the cantilever tube facing away from the housing and between the end of the cantilever tube facing away from the housing and a ball joint, the joint center point of which coincides with the longitudinal axis of the leadscrew.

10. The linear actuator according to claim 9, wherein the end of the cantilever tube facing away from the housing is fixedly connected to a support element passing by the dampening element or comprises such a support element, which comprises a sliding block movably supported in the longitudinal direction and configured to receive a bolt passing through a joint head of the ball joint, so that the cantilever tube is supported on the bolt with respect to a rotation about the longitudinal axis of the leadscrew.

\* \* \* \* \*